(No Model.)　　　　　　　　　　　　　　　4 Sheets—Sheet 1.
E. D. PRIEST.
CONTROLLER FOR ELECTRIC MOTORS.
No. 556,862.　　　　　　　　Patented Mar. 24, 1896.
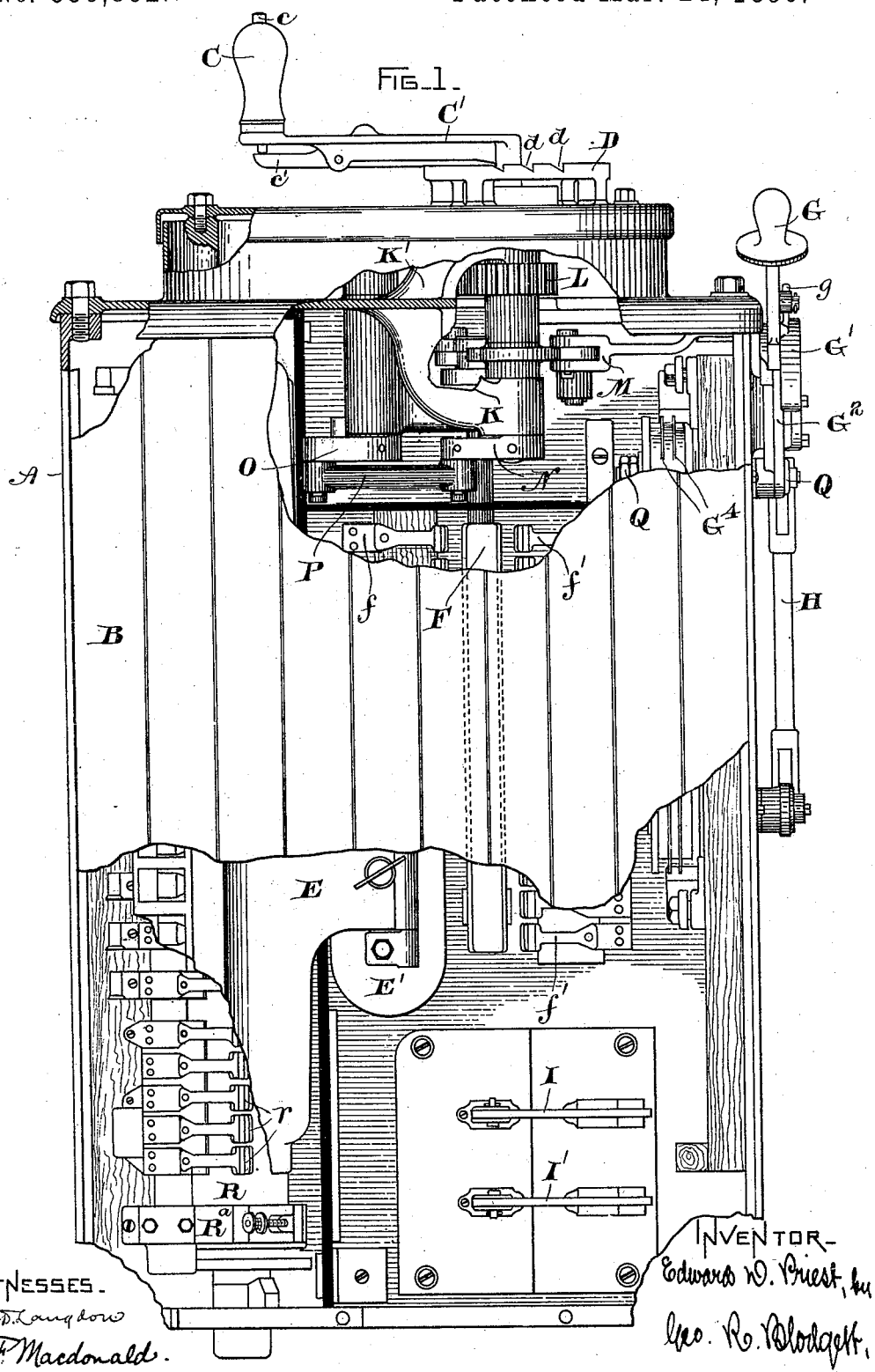

(No Model.) 4 Sheets—Sheet 2.
E. D. PRIEST.
CONTROLLER FOR ELECTRIC MOTORS.
No. 556,862. Patented Mar. 24, 1896.
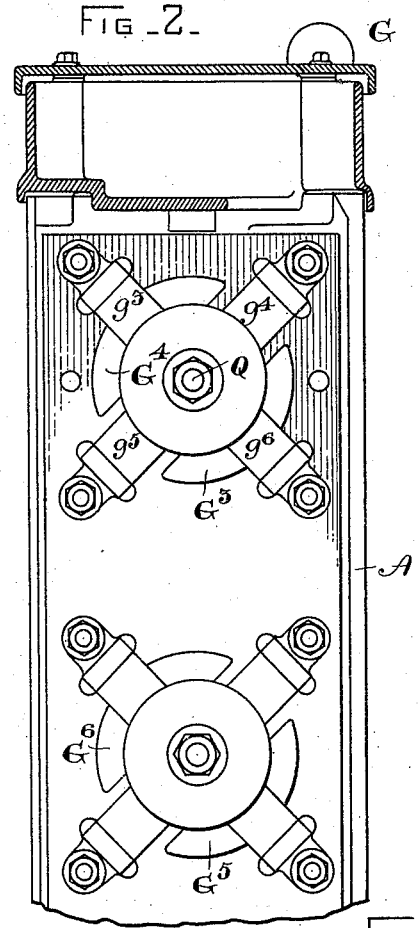
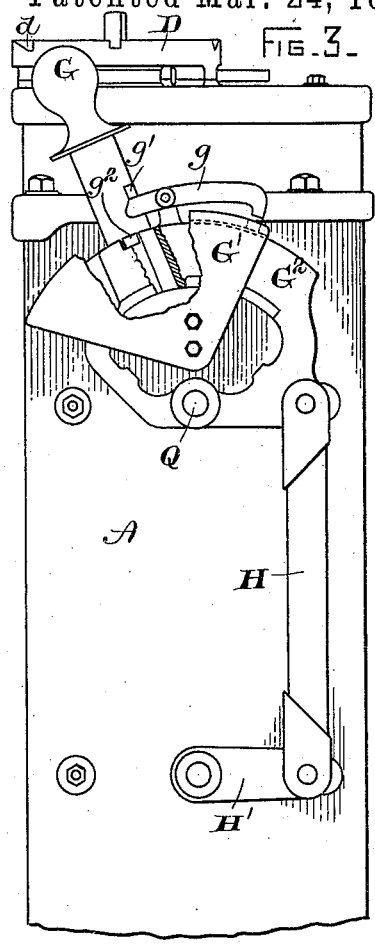
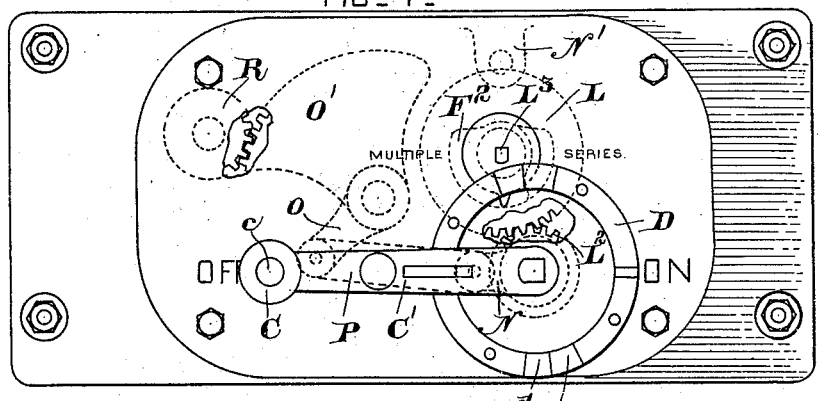
WITNESSES:
A. F. Macdonald.
J. Ed. Langdon.
INVENTOR:
Edward D. Priest, by
Geo. R. Blodgett,
Atty.

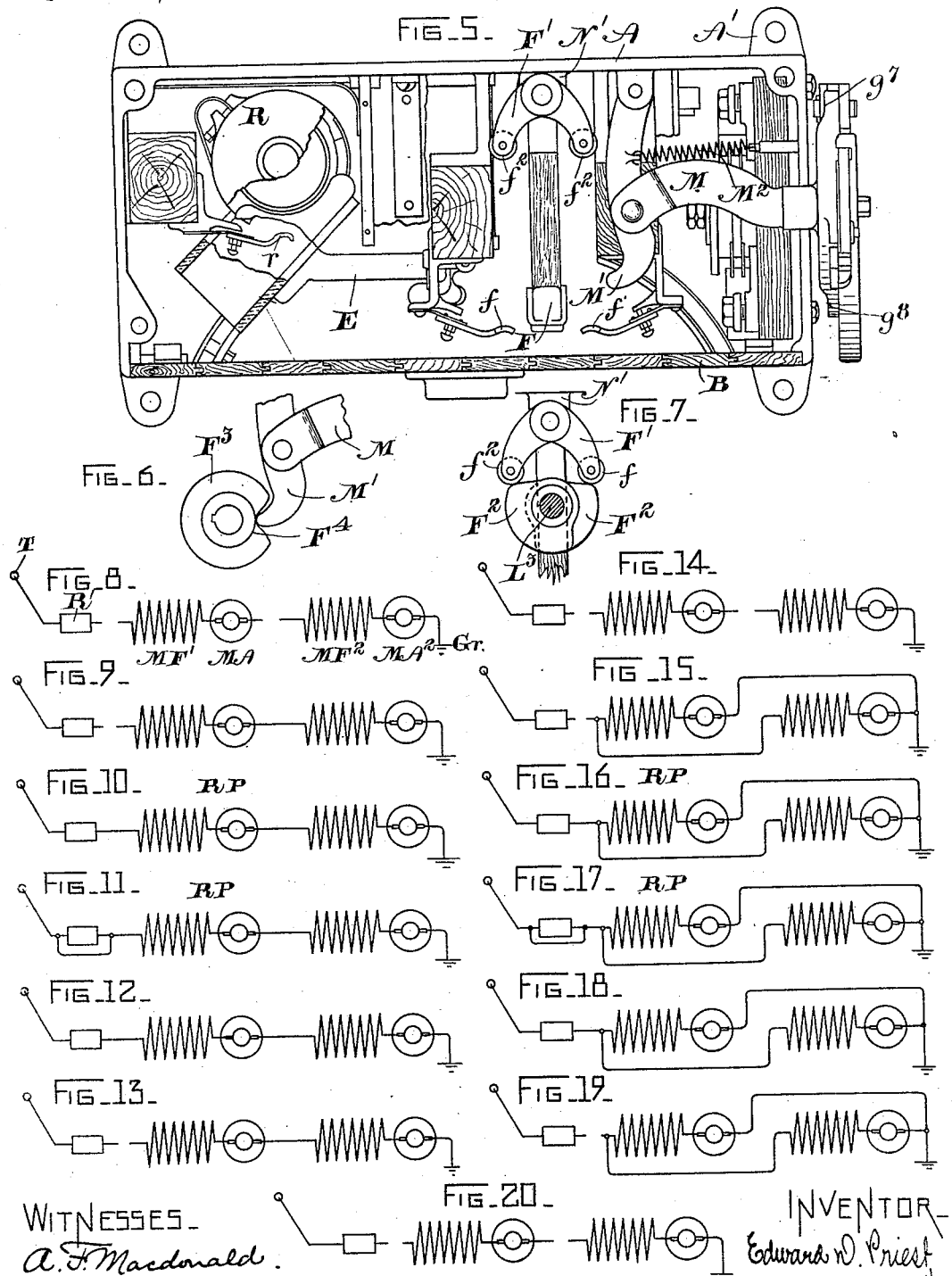

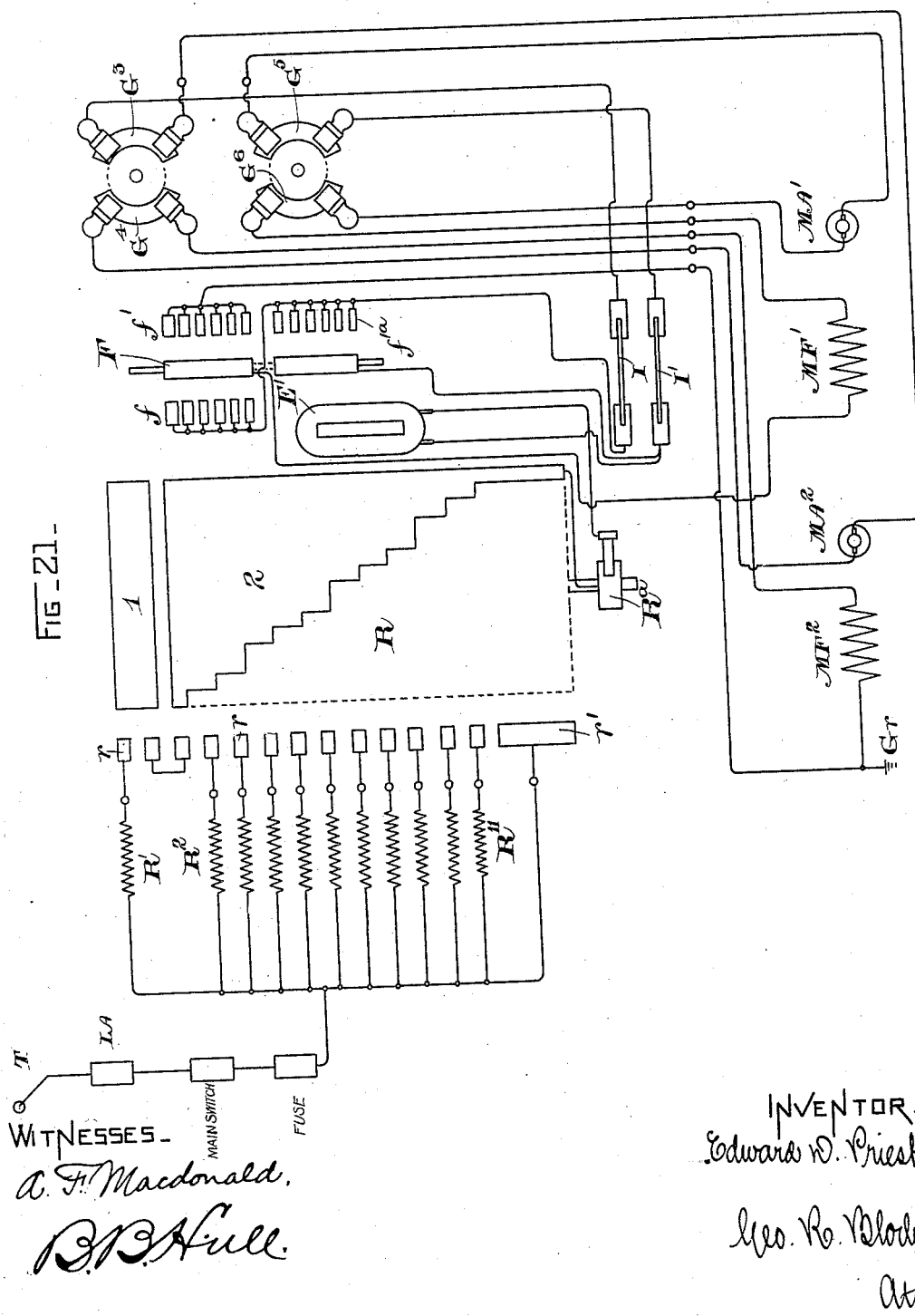

UNITED STATES PATENT OFFICE.

EDWARD D. PRIEST, OF SCHENECTADY, NEW YORK, ASSIGNOR TO THE GENERAL ELECTRIC COMPANY, OF NEW YORK.

CONTROLLER FOR ELECTRIC MOTORS.

SPECIFICATION forming part of Letters Patent No. 556,862, dated March 24, 1896.

Application filed April 9, 1895. Serial No. 545,106. (No model.)

*To all whom it may concern:*

Be it known that I, EDWARD D. PRIEST, a citizen of the United States, residing at Schenectady, in the county of Schenectady and State of New York, have invented certain new and useful Improvements in Controllers for Electric Motors, of which the following is a specification.

My invention relates to controllers for electric motors, particularly to railway-motors, and has for its object to provide a controller reliable in action, so that it will be practically impossible for it to operate improperly; simple in design, so that it may not confuse the operator, and permit of the least possible amount of injury from attempt at improper manipulation in case the operator becomes confused; in which the power may be turned off quickly; which will control the motors with the greatest possible economy and power and in such a way that maximum traction may always be obtained when desired; convenient in operation, requiring a minimum amount of power to operate, and in which the injury either to the controller or to the motors by constant handling will be reduced to a minimum.

In carrying out the objects of my invention I adopt the well-known series-parallel system of control, but in the same controller, without introducing undue complication, I use the straight rheostatic control of the old types of controller, or, in other words, I combine in one controller the two methods of control, which may be called the "maximum-efficiency" and the "maximum-traction" methods. For ordinary running it is of course most efficient to start the motors in the series position, but when the track is slippery, or when for any other reason it is desirable to have the maximum amount of power, it sometimes happens that only one set of wheels would slip, and the revolving motor would cut down the current furnished to the other motor in series with it, so that very little power would be obtained. In such cases it is desirable to start the motors in multiple with a resistance in series with them, and I have arranged my controller to provide for this combination. Briefly, the arrangement consists in an operating-handle for the resistance, which is arranged upon a reciprocating cylinder, as in my Patent No. 533,920, issued February 12, 1895, and is also connected to a series-parallel switch of simple construction, more fully described hereinafter. Geared to this handle is a dial revolving once for every two revolutions of the operating-handle, one half the dial representing the series position of the motors and the other half the multiple. I also so arrange my improved controller that in whichever direction the handle is turned the current can only be turned on through resistance, it being understood that the handle may be freely operated in either direction of motion. In one direction the motors are coupled in series or maximum-efficiency relation, and the combination changes, as hereinafter pointed out, to the multiple position by continuous rotation, while in the other direction they may be directly thrown into the multiple or maximum-traction combination. In neither case can the train be started with a jerk. As the current can be turned on only through the resistance, and this resistance is arranged especially for the series combination, the car will start less quickly, if anything, (the current dividing between the two motors,) when the handle is turned to the multiple position; so also in turning off the current. This can only be done through resistance.

By preference the system which I employ in making the changes is the so-called "open-circuit" system. In other words, the circuit is opened between the trolley and the motors before each change of motor relation and only closed after the change is effected. As in my patent above referred to, I prefer to open the circuit always upon the resistance-cylinder, which I provide with a blow-out magnet. Thus there is no sparking at the contacts of the series-multiple switch and the change of motor relation may be effected easily.

The accompanying drawings show an embodiment of my invention, Figure 1 being a front elevation, partly broken away, of my improved controller. Figs. 2 and 3 are side elevations showing the detail of the reversing-switches. Fig. 4 is a top plan view of the top of the controller with parts of the mechanism shown in dotted lines. Fig. 5 is a plan view with the top removed, partly in section.

Figs. 6 and 7 show details of the series-parallel switch and reversing-gear interlocked. Figs. 8 to 20 are diagrams of the motor combinations preferred, and Fig. 21 is a general diagram of the circuits.

A is the body of the controller.

B is the front or cover, in the case illustrated made of wood, although it may be of other material.

C is the handle, of which C' is the crank. It is provided with a latch $c'$, controlled by a spindle $c$ in the handle.

D is the segment upon which the handle-latch operates, it being provided with notches $d\,d$, indicating the positions of the controller. As indicated, the handle is free to move in one direction, but each step in the opposite direction must be made by raising the latch or dog $c'$ by means of the spindle $c$ before the handle can be operated. By this means any carelessness of the motorman in turning on the power too rapidly is checked, while he can turn off the power at once should it be desired.

At E, I indicate the pole-piece of the blow-out magnet provided with its coil E'. The form of this device is substantially like that shown in the patent to William B. Potter, No. 524,396, although other forms may be employed if desired.

F is the series-parallel switch, a face view of the contacts of which is shown in Fig. 21 in diagram. It is provided with two sets of co-operating fixed contacts $f f'$ and, according as it is upon one side or the other of its central position, makes the change from series to parallel relation of the motors.

G is the handle of the reversing-switch.

I provide two reversing-switches, (as will be fully explained in referring to Figs. 2 and 3,) which are operated by a single handle and connected by the rod H.

I I' are the cut-out switches, by which a disabled motor may be removed from circuit and the apparatus operated with a single motor.

At K is a bracket cast upon the top of the controller and affording a bearing for the operating-shaft.

N is a lever-arm affixed below the bracket to the operating-shaft and working a connecting-rod P, by which the rod O is also operated, as will be more fully explained by reference to Fig. 4. A similar bracket K' furnishes an upper bearing for the parts. The shaft of one of the reversing-switches is indicated at Q, the resistance-cylinder at R, and its co-operating fixed contacts at $r\,r$, respectively.

Referring to Figs. 2 and 3, I show the detail of the reversing-switches, Fig. 2 being a view of the switch-contacts upon the inside of the case and Fig. 3 showing the means of operating them situated upon the outside of the case. The handle G is loosely connected to the cam $G^2$ and moves over the sector G', which is partly broken away to show the construction. A latch $g$ is pivoted upon a lug projecting from the cam $G^2$ and co-operates with a notch in the sector G', so that the reversing-switch may not be accidentally displaced. Lugs $g'\,g^2$ prevent the removal of the handle G except in one position of the cam $G^2$, that in which the current is broken upon the reversing-switches, the lug $g^2$ also operating to press the latch $g$ into the notch before the handle G can be removed. H is the rod or link connecting the two switches, or, more accurately, connecting the cam $G^2$ with the lever H' operating the lower switch. The detail of the contacts shown in Fig. 2 is readily understood. The switch consists of plates $G^3\,G^4$ making contact with the fixed contacts $g^3$ to $g^6$, respectively. When the contacts $g^3\,g^4$ are joined by the plate $G^4$, and $g^5\,g^6$ by the plate $G^3$, the circuit of the motors is in one direction, while, as will be manifest, when the plate $G^4$ connects the fixed contacts $g^3\,g^5$ and the plate $G^3$ connects $g^4$ and $g^6$ the circuit will be in the other direction. The lower switch, provided with its contact-plates $G^5\,G^6$, co-operates with its fixed contacts in the same way, and, as will be manifest from an inspection of its connections, the lever H' and the rod or link H will be simultaneously operated with the upper switch by means of the handle G.

Referring now to Fig. 4, the operation of the switching mechanism will be understood from an inspection of the mechanism shown in dotted lines. The segment O', operated by the rod P connected to the lever N affixed to the lower part of the shaft of the operating-handle, operates the resistance-cylinder R, the segment being provided with teeth meshing with those of a pinion upon the cylinder. At the same time a small gear $L^2$ upon the main shaft of the operating-handle is turned by the rotation of that handle, operating another gear, L, affixed to a central shaft $L^3$, and thus rotating the cams $F^2\,F^2$. (Shown in dotted lines.) These cams are fixed to studs on the under side of the top or cover of the apparatus. A fuller understanding of the operation will be derived from an inspection of Figs. 5, 6, and 7, taken in connection with Figs. 1 and 4.

Referring first to Fig. 7, when the shaft $L^3$ rotates the cams $F^2\,F^2$ also rotate and operate the cam-roller F', affixed to the lug U' at the back of the case, thus reciprocating the series-parallel switch F, so that it makes contact with either one or the other of the sets of fixed contacts $f f'$, its position determining the relation of the motors, when thrown to the right in the figure the motors being in parallel and when thrown to the left being in series.

In Figs. 5 and 6 is also shown an interlocking mechanism between the reversing-switches and the series - parallel switch. Upon the shaft $L^3$ is also fixed a roller or disk $F^3$, having a notch $F^4$, with which co-operates the toe of the pawl M', operated by the lever M, connected to the reversing-switch handle. For greater certainty of action the spring $M^2$ is affixed to the pawl $M'$, so that unless it is positively engaged with the notch $F^4$ in the roller $F^3$ it is withdrawn, so that the roller may rotate freely. The means for effecting this withdrawal is shown on the right in Fig. 5. The cam $G^2$, operated by the handle G, has at its ends cut-away portions $g^7$ $g^8$ co-operating with the bar M. When the cam is in such position that one of these portions registers with the end of the bar, the spring $M^2$ may withdraw the pawl $M'$ from the notch $F^4$ in the roller $F^3$ and leave the shaft $L^3$ free to rotate; but in any intermediate position the pawl engages with the notch and locks the shaft against rotation. It is understood that the same lever operates the reversing-switches at both ends of the car, but one lever being provided, so that if there be two controllers the act of withdrawing the lever from one locks it in the open-circuited position, so that it cannot be tampered with while the motorman is at the other end of the car.

In Fig. 5 the resistance-cylinder is shown in plan and one of the fixed contacts or fingers $r$ is also shown inclosed in a chute of insulating material attached to the pole-piece E of the magnet.

In Figs. 8 to 20 I show the motor combinations which I prefer to employ. In this I have employed the notation $R'$ for the resistance $MF'$ $MA'$ for the field and armature, respectively, of the first motor, $MF^2$ $MA^2$ for the same parts of the second motor, and G$r$ for ground. It will be observed that in Fig. 8, which is the first position of the controller, and that in which the handles may be removed, and at which it is designed that the controller shall be left when not in use, the circuit is open between the resistance and the first motor and between the two motors. In Fig. 9 the two motors are coupled in series, but are not yet in circuit with the resistance, as the circuit is open between the resistance and the first motor. In Fig. 10 this gap is closed and the motors are in the first running position, (indicated by the letters RP.) The second running position is that shown in Fig. 11, in which the resistance is cut out. The transition steps between Figs. 12 and 15 are indicated in the respective figures, in Fig. 12 the resistance being again cut in, in Fig. 13 the first break in the circuit being made, and in Fig. 15 the motors being in multiple or parallel, but with a gap between the resistance and the first motor. In Fig. 16 the third running position is made, and this latter gap is closed, the circuit being through the resistance in series with both of the motors, which are in multiple. In Fig. 17 the final running position is found, differing only from Fig. 16 in having the resistance short-circuited. The steps from Figs. 17 to 20 are the reverse of those just noted—that is, in Fig. 18 the motors are in multiple with the resistance included in series. In Fig. 19 the first break is made, and in Fig. 20 the motors are separated from each other and from the resistance in the same way as in Fig. 8.

By the term "running position" I mean those positions in which no injury will be done by allowing the motors to remain, although the term more strictly applies only to those positions in which the resistance is entirely cut out of circuit.

Fig. 21 illustrates the circuits of my improved controlling apparatus. Therein T represents the trolley or source of current. The lightning-arrester, the main switch, and the fuse (or circuit-breaker of any other type) are indicated diagrammatically by the rectangles following the trolley. The resistances are arranged in multiple and lettered $R'$ to $R^{11}$, though other numbers of resistances may be used, it being understood that the rotation of the resistance-cylinder R brings a greater number of resistances into circuit, so that the total resistance is reduced, not by cutting out portions of resistance and thus diminishing its carrying capacity, but by cutting in resistances in multiple, thus increasing the carrying capacity of the total. The resistance-brushes or fixed contacts are lettered, as before, $r$. At $r'$ there is a final or short-circuiting contact, the path of the current then being from the trolley direct to the contact $r'$ and the motors, cutting out all of the resistances simultaneously. The other parts of the diagram have been referred to in describing the apparatus.

The circuits are as follows: The current entering at the trolley and passing through the resistances comes out to the final permanent contact $R^a$, which is arranged to be in circuit, no matter in what position the cylinder may be. The current then passes around the blow-out magnet-coil $E'$ and to the cut-out switch $I'$. If the switch F be thrown to the left, as in the first position of the motors it would be, then the lead to the lower half of the switch is open-circuited, and the only path of the current is across the cut-out switch $I'$. It then passes through the reversing-switch by the plate $G^5$, the motor-armature $MA'$, through the other side of the reversing-switch by the plate $G^6$, through the motor-field $MF'$ to the series-multiple switch F, the contacts $f$, to the cut-out switch I, through the reversing-switch by the plate $G^3$, the motor-armature $MA^2$, through the other side of the reversing-switch by the plate $G^4$, through the motor-field $MF^2$ and to ground. When the series-multiple switch is in the right-hand position, however, making contact with the brushes $f'$ $f'^a$, the current is from the cut-out switch $I'$ in two directions: first, as before, across the cut-out switch to the reversing-switch and by the plate $G^5$ through the motor-armature $MA'$, through the reversing-switch by the plate $G^6$, through the motor-field $MF'$, to the series-multiple switch, to the fixed contacts $f'$ and thence directly to ground. The other path of the current is from the cut-out switch $I'$ directly to the series-multiple switch F, thence to the contacts $f'^a$, thence to the cut-out switch I, through the reversing-switch by the plate $G^3$, through the motor-armature $MA^2$, through the reversing-switch by the plate $G^4$, to the motor-field $MF^2$ and to ground.

Referring now to Fig. 4, it will be observed that the pinion $L^2$, meshing with the gear L, and the sector $O'$, meshing with the pinion upon the resistance-cylinder R, are so related that the rotation of the handle C acts first to throw the series-multiple switch F to the left, thus putting the motors in series by means of the cams $F^2$, this closing the circuit between the motors, but not closing the circuit between the trolley and the first motor; then closing the circuit between the trolley and the motors through the resistance, the upper brush $r$, Fig. 21, making contact with plate 1 upon the resistance-cylinder R and the next two brushes serving to connect that plate with plate 2. Further rotation then couples in more of the resistance in multiple, as more and more of the brushes $r$ touch the plate 2, until the resistance is all cut out.

In passing through the entire series of operations necessary in the controller, during which the handle makes two revolutions, the operation would be as follows: Turning from the position in Fig. 4 marked "off" to one hundred and eighty degrees, the first "on" position, or position in series, is reached, the indicator upon the dial pointing to the series position. Continuing one hundred and eighty degrees, the current is cut off and then the handle is at the off position. Another one hundred and eighty degrees turn, the current is again on and the handle is at the multiple position, as indicated by the dial. Another one hundred and eighty degrees, and the current is again cut off, the handle standing at the off position. For the straight rheostatic control the handle is turned one hundred and eighty degrees from the first off position in the opposite direction. The motors are thus connected in multiple with the rheostat in series which is thus cut out without going through the series position. The current may then be cut off by turning the handle one hundred and eighty degrees in either direction. By this arrangement the handle is always at the off position when it stands at the left and always at the on position when on the right of the controller, in a diametrically-opposite position. In whichever direction the handle is turned these conditions always obtain. The operator does not need to read the dial to know when the current is turned off or on, but has only to see or feel that the handle is pointing to the proper position. In order to effect the motion of the series-parallel switch at the proper point, the current is turned off, not after the handle has moved the full one hundred and eighty degrees, but when it has moved about one hundred and thirty degrees, the rest of the half-circle after the circuit is broken being required to change the combinations from series to parallel, or parallel to series, as the case may be.

A peculiar advantage which I have found in the arrangement pointed out over the controllers in which the handle is always moved in one direction to turn the current on and in the opposite direction to turn the current off is that by going directly into the multiple position maximum traction may be obtained under all conditions; and another and perhaps still more important advantage is that the wear on the controller and the tendency to break down the insulation in the motors from inductive reaction when the circuit is broken is only one-half what it is in breaking the circuit by returning through the series position. A further advantage is that since at all times current can be turned directly on or off from either series or multiple position without going through the position not in use, it follows that it may be turned off quickly and without further accelerating the train, as when the current is turned off from a multiple position by going through that in series. Furthermore, the motors are always handled alike, each doing its full share of the work and taking advantage of the entire weight on the driving-wheels.

As no change in the combination of the motors can take place except when the circuit is broken, all arcing is confined to the rheostatic cylinder, and the interlocking mechanism does not permit the reversing-switch to be thrown when the current is on, while the removable handle is so arranged, as already pointed out, as to lock the controller when not in operation.

What I claim as new, and desire to secure by Letters Patent of the United States, is—

1. A controller for electric motors comprising means for connecting the motors in series or parallel and varying the resistance in circuit to suit the conditions of running, such means being operated by movement of the controller-handle in one direction from a position in which the circuit is open, and means for controlling the motors by the rheostat alone, such means operated by the movement of the handle in the opposite direction from its open-circuit position.

2. A controller for electric motors comprising a reciprocating resistance-switch, a separate reciprocating series-parallel switch, and permanently-connected means for operating the two switches simultaneously from a single handle.

3. A controller for electric motors, comprising a cylindrical reciprocating resistance-switch, a separate reciprocating series-parallel switch, and permanently-connected means for operating the two switches simultaneously from a single handle.

4. A controller for electric motors, comprising a reciprocating resistance-switch, a separate reciprocating series-parallel switch, means for operating the switches from a single handle, reversing-switches for the motors, and interlocking means between the operating-handle and the reversing-switches, whereby the operation of the reversing-switches is prevented except when the circuit is broken.

5. A controller for electric motors comprising a reciprocating resistance-switch, a separate reciprocating series-parallel switch, an operating-handle, and means for operating the two switches from the one handle, comprising gearing between the operating-handle and the series-parallel switch, whereby the handle makes a revolution for each reciprocation of the series-parallel switch in opposite directions from a central position in which the circuit is broken.

6. A controller for electric motors, comprising a reciprocating resistance-switch, a separate reciprocating series-parallel switch, an operating-handle, means for operating the two switches from one handle, comprising gearing between the operating-handle and the series-parallel switch, whereby the handle makes a revolution for each reciprocation of the series-parallel switch in opposite directions from a central position, and means connected to and operated by the handle and arranged to indicate the series and parallel positions of the series-parallel switch.

7. A controller for electric motors, comprising a reciprocating resistance-switch, a separate reciprocating series-parallel switch, an operating-handle having an off and an on position at opposite sides of the controller, and connecting mechanism between the operating-handle and the two switches, whereby the handle may take the same positions for off and on in both the series and the parallel positions of the series-parallel switch.

In witness whereof I have hereunto set my hand this 8th day of April, 1895.

EDWARD D. PRIEST.

Witnesses:
  B. B. HULL,
  A. F. MACDONALD.